United States Patent
Van Rooyen

(10) Patent No.: US 6,744,853 B1
(45) Date of Patent: Jun. 1, 2004

(54) TESTING OF TELEPHONE LINES

(75) Inventor: Petrus Cornelius Albertus Van Rooyen, Pretoria (ZA)

(73) Assignee: Oakdene Limited, Guernsey (GB)

( * ) Notice: Subject to any disclaimer, the term of this patent is extended or adjusted under 35 U.S.C. 154(b) by 0 days.

(21) Appl. No.: 09/889,680

(22) PCT Filed: Jan. 21, 2000

(86) PCT No.: PCT/IB00/00056

§ 371 (c)(1),
(2), (4) Date: Sep. 24, 2001

(87) PCT Pub. No.: WO00/44155

PCT Pub. Date: Jul. 27, 2000

(30) Foreign Application Priority Data

Jan. 20, 2000 (ZA) ................................................ 99/0404

(51) Int. Cl.⁷ .......................... H04M 1/24; H04M 3/08; H04M 3/22
(52) U.S. Cl. ..................... 379/21; 379/1.01; 379/15.01; 379/20; 379/27.01; 379/29.01
(58) Field of Search ........................ 379/1.01, 9, 9.06, 379/14.01, 15.01, 15.05, 16, 17, 20, 22.03, 26.01, 27.01, 27.06, 29.01, 29.1, 31

(56) References Cited

U.S. PATENT DOCUMENTS

| | | | |
|---|---|---|---|
| 3,814,870 A | 6/1974 | Miller | |
| 3,898,396 A | 8/1975 | Gushue et al. | |
| 4,622,438 A | 11/1986 | Shimizu et al. | |
| 4,794,632 A | * 12/1988 | Burton et al. | 379/29.01 |
| 5,687,214 A | * 11/1997 | Steefel | 379/27.01 |
| 6,108,404 A | * 8/2000 | Hardy et al. | 379/21 |
| 6,212,258 B1 | * 4/2001 | Bella et al. | 379/29.01 |

* cited by examiner

Primary Examiner—Curtis Kuntz
Assistant Examiner—Quoc D Tran
(74) Attorney, Agent, or Firm—James Ray & Assoicates

(57) ABSTRACT

A telephone line testing device for use with a PABX having a plurality of input lines. The testing device includes test circuitry, a first connecting means for connection to a telephone line of a telephone system, a second connecting means for connection to a desired input line of the PABX, a first switch means for connecting either the PABX input line or the test circuitry to the telephone line. The test circuitry includes a test signal generating means for generating a test signal, a ringing signal detection means for detecting the presence of a ringing signal on the telephone line, and a second switch means which is responsive to the ringing signal detection means for automatically supplying a test signal generated by the test signal generating means to the telephone system when the test circuitry is connected to the telephone line by the first switch means and a ringing signal is desired.

6 Claims, 3 Drawing Sheets

TESTING OF TELEPHONE LINES

This invention relates to a telephone line testing device for use with a PABX.

U.S. Pat. No. 3,898,396 provides test equipment for verifying trunk routing in a telephone system. A series of spoken words is provided to identify the area code and the telephone exchange to which a trunk under test is connected. The equipment includes a plurality of input channels each coupled to a verification line for a corresponding telephone exchange. A ringing signal on any channel is detected and special logic circuitry is provided to identify the required telephone exchange digits and to produce a read out of the area code and exchange digits for that channel.

With PABX's there is always a difficulty in identifying if a problem is the responsibility of the organisation that supplied and services the PABX and its associated wiring, or of the utility supplying the telephone lines. The present invention provides a solution thereto.

According to the invention there is provided a telephone line testing device for use with a PABX having a plurality of input lines connected to a plurality of telephone lines of a telephone system, each of the PABX input lines being associated with a telephone line, which includes test circuitry having
a test signal generator for generating a test signal;
a ringing detector for detecting the presence of a ringing signal on a telephone line; and
a second switch means which is responsive to the ringing signal detector for automatically supplying a test signal generated by the test signal generator when a ringing signal is detected;
a first connecting means for connection to the telephone lines of the telephone system;
characterised therein that it further includes
a second connecting means for connection to the input lines of the PABX;
a first switch means for connecting a selected one of the telephone lines either to the PABX input line associated with that telephone line or the test circuitry.

It will be appreciated by those skilled in the art that the test signal generator may be connected directly to the first switch means and may then be energised by the second switch means when a ringing signal is detected, or it may be connected to the first switch means via the second switch means. It the test signal generator is connected directly to the first switch means it may have a sufficiently high impedance so that the telephone line is not closed when the first switch means is operated.

The first connecting means may include a plurality of first terminals to which a corresponding number of telephone lines may be connected.

The second connecting means may also include a plurality of second terminals to which a corresponding number of PABX input lines may be connected, there being the same number of second terminals as there are first terminals, and with designed first and second terminals being associated with one another.

The first switch means may include a plurality of mechanically operable switches, each switch having a first contact connected to an associated first terminal, a second contact connected to the second terminal associated with said first terminal, a third contact connected to the test circuitry, and a contactor for connecting the first contact to either the second or third contact.

The ringing signal detector may be connected to all the third contacts of the first switch means.

The test signal generator may be connected to all the third contacts of the first switch means via the second switch means.

The telephone line to be tested may be accessed via the PABX, using another telephone line.

By means of the invention a PABX telephone operator may, if there is a fault on one of the lines, determine easily and quickly if the fault is in the telephone line or in the PABX.

The invention is now described, by way of an example, with reference to the accompanying drawings, in which:

The telephone testing device may have a lighting protection means.

The telephone line to be tested may be accessed via the PABX, using another telephone line.

By means of the invention a PABX telephone operator may, if he believes that one of the telephone lines is faulty, easily and quickly identify which telephone line it is.

The invention is now described, by way of an example, with reference to the accompany drawings, in which.

Figure 1:
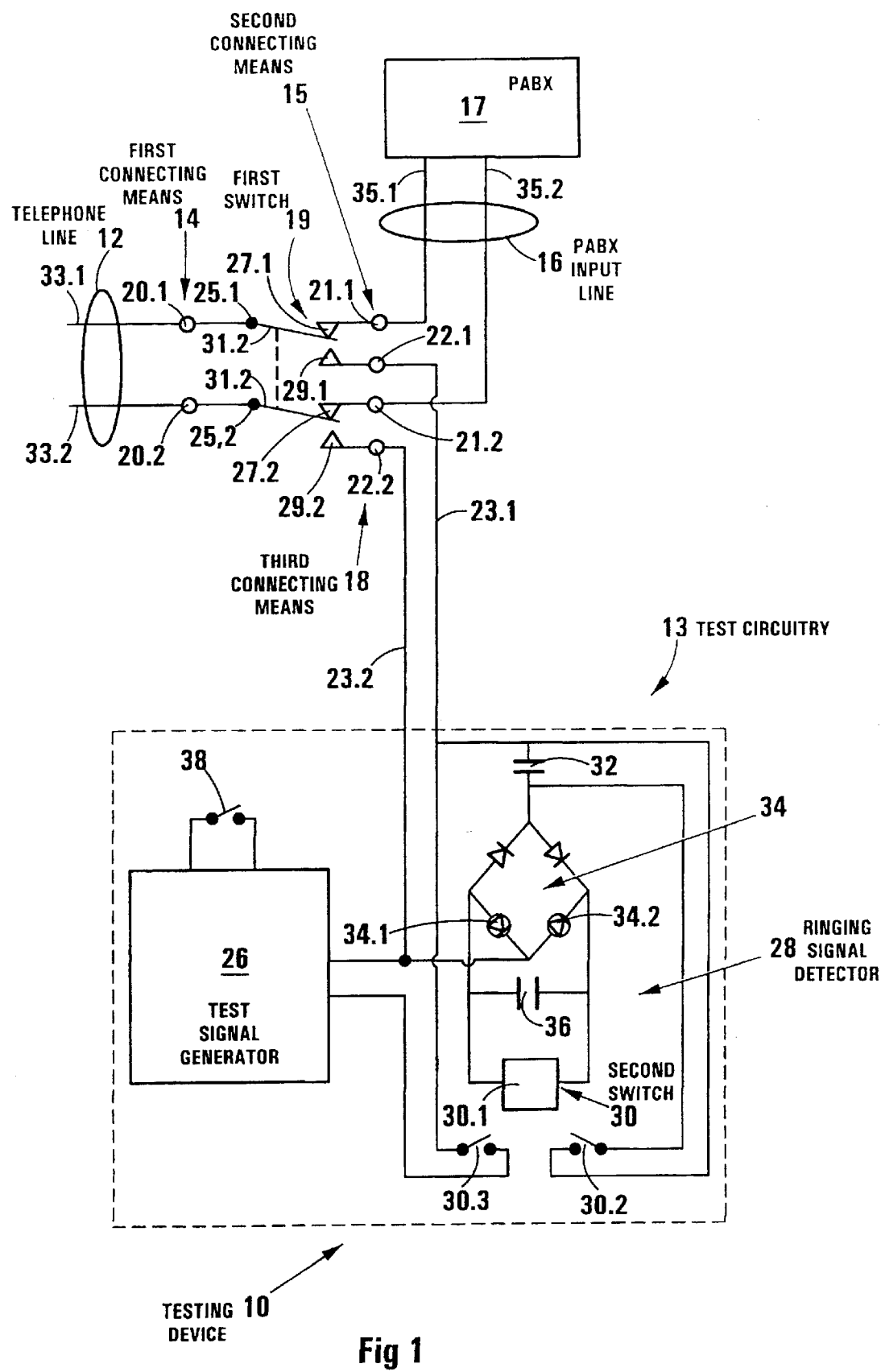
FIG. 1 shows a schematic circuit diagram of a telephone line testing device in accordance with the invention connected to a PABX and a telephone line.

Referring now to FIG. 1, a telephone line testing device in accordance with the invention is generally indicated by reference numeral 10. The telephone line testing device 10 includes test circuitry 13, a first connecting means 14 for connection to a telephone line 12 of a telephone system, a second connecting means 15 for connection to an input line 16 of a PABX 17, a third connecting means 18 for connection to the test circuitry 13, and a first switch 19 for connecting either the PABX line 16 or the test circuitry 13 to the telephone line 12. The connecting means 14, 15 and 18 are in the form of sets of terminals 20.1 and 20.2, 21.1 and 21.2, and 22.1 and 22.2, respectively. The first switch 19 has contacts 25.1 and 25.2, 27.1 and 27.2, and 29.1 and 29.2 and contactors 31.1 and 31.2, such that the first switch 19 is a double pole type switch. The contactors 31.1 and 31.2 are manually operated and connect either the contacts 25.1 and 25.2 to the contacts 27.1 and 27.2 respectively or to the contacts 29.1 and 29.2 respectively. As indicated, the terminals 20.1 and 20.2 are connected to the contacts 25.1 and 25.2 respectively; the terminals 21.1 and 21.2 are connected to the contacts 27.1 and 27.2 respectively; and the terminals 22.1 and 22.2 are connected to the contacts 29.1 and 29.2 respectively.

The test circuitry 13 has a test signal generator 26 provided with an activation switch 38; a ringing signal detector 28 for detecting the presence of a ringing signal on the telephone line 12; and a second switch 30 which is responsive to the ringing signal detector 28 for automatically connecting the test circuitry 13 to the telephone system when the test circuitry 13 is connected to the telephone line 12 by the switch 19 and a ringing signal is detected. The test signal generator 26 generates a suitable audible signal.

The test circuitry 13 includes a DC blocking capacitor 32, a rectifying bridge 34 and a storage capacitor 36. The second switch 30 is in the form of a relay, having a coil 30.1 and normally open contactors 30.2 and 30.3. The contactor 30.2 bypasses the blocking capacitor 32 when a ringing signal is detected. The contactor 30.3 connects the test signal generator 26 to the telephone line 12. The rectifying bridge 34 has two LED's 34.1 and 34.2.

As seen in FIG. 1, the telephone line 12 has two cores 33.1 and 33.2. Similarly, the PABX line 16 has two cores 35.1 and 35.2. The cores 33.1 and 33.2 are connected to the terminals 20.1 and 20.2 respectively. The cores 25.1 and 35.2 are connected to the terminals 21.1 and 22.2 respectively. The test circuitry 13 is connected to terminals 22.1 and 22.2 by a two core wire having cores 23.1 and 23.2.

The rectifier bridge 34 is connected to terminals 22.1 and 22.2 via the blocking capacitor 32. The test signal generator 26 is also connected to terminals 22.1 and 22.2 via the second switch 30.

The method for determining whether there is a fault in the telephone line 12 upstream from the PABX 17 includes operating the first switch 19 to disconnect the telephone line 12 from the PABX 17 and connect the telephone line 12 with the test circuitry 13. The telephone line 12 is dialed by an operator using the PABX 17 or some other telephone instrument. If the line 12 is functional, the alternating current caused by the ringing tone is converted to a direct current by the rectifier bridge 34 causing the relay 30 to close the telephone line 12 and connect the operator's telephone to the test signal generator 26 which provides an audible signal which is heard by the operator. In addition, when relay 30 closes, the contactor 30.2 bypasses the blocking capacitor 32 causing the LED 34.1 or 34.2 to indicate a direct current. If the telephone line 12 is not functional the test signal is not heard and/or the LED's 34.1 and 34.2 are not energised. If the test signal is heard and/or LED 34.1 or 34.2 emits light then the fault originates at the PABX 17 and if no test signal is heard or not light emitted by LED 34.1 or 34.2 then the fault originates from the telephone line 12.

Figure 2:
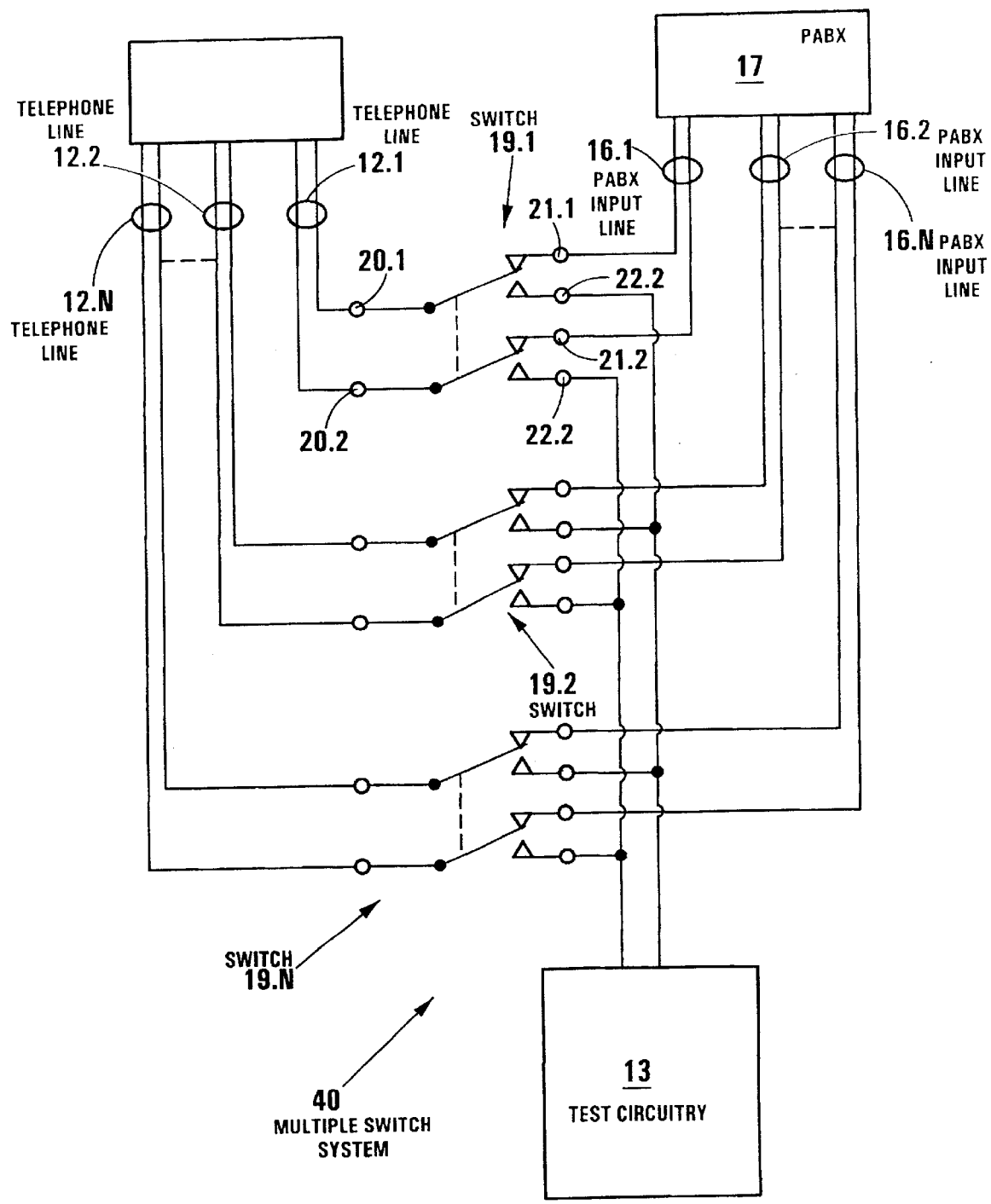
FIG. 2 shows schematically how the telephone testing device is connected to a plurality of telephone lines.

Referring now to FIG. 2, a multiple switch system in accordance with the invention is generally indicated by the reference numeral 40. The multiple switch system comprises a number of switches 19.1, 19.2 to 19.N which are connected to a corresponding number of telephone lines 12.1, 12.2 and 12.N and PABX lines 16.1, 16.2 and 16.N. Each switch 19.1, 19.2 to 19.N is as shown in FIG. 1, with each telephone line 12.1, 12.2 to 12.N having two cores connected to the terminals 20.1 and 20.2 of its associated switch and each PABX line 16.1, 16.2 to 16.N having two cores connected to the terminals 21.1 and 21.2 of its associated switch. The test circuit 13 is connected to the terminals 22.1 and 22.2 of all the switches 19. Any one of the telephone lines 12.1, 12.2 to 12.N can be connected to the test circuitry 13 to enable an operator to test that particular line.

Figure 3:
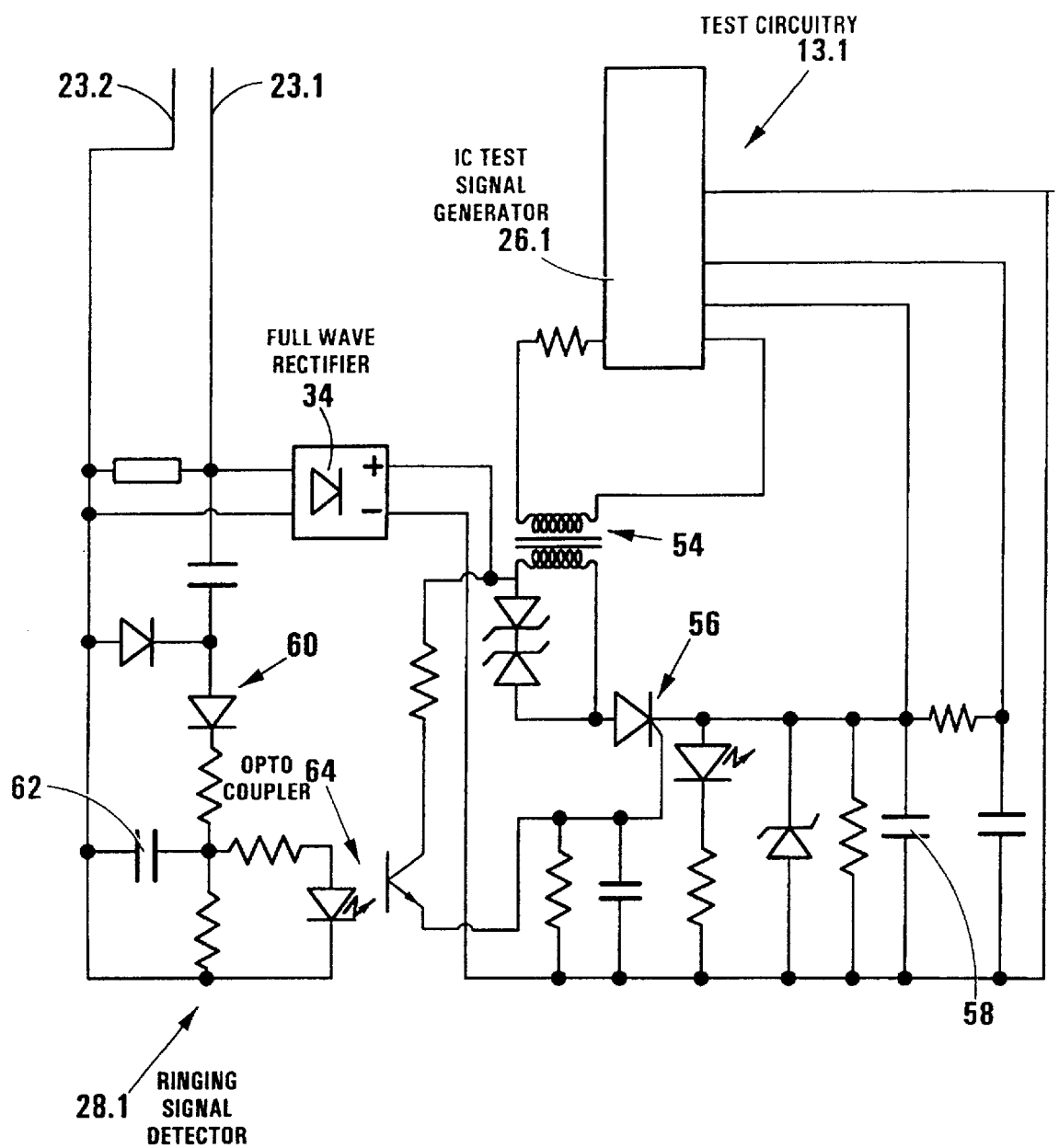
FIG. 3 shows a schematic circuit diagram of a second embodiment of test circuitry.

Referring now to FIG. 3, a second embodiment of test circuitry 13.1 is shown. This embodiment 13.1 has cores 23.1 and 23.2 which are connected to the terminals 22.1 and 22.2. It further has an IC test signal generator 26.1 which is connected to the cores 23.1 and 23.2 by means of a full wave rectifier 34, a transformer 54, and SCR switch 56 and a signal capacitor 58. It also has a ringing signal detector 28.1 also connected to the cores 23.1 and 23.2. This ringing signal detector comprises a half wave rectifier 60, a charging capacitor 62 and an opto coupler 64 which is connected to the gate of the SCR 56. In use, when the test circuitry 13.1 is connected to an operative telephone line, and an AC ringing signal is received, it is rectified by the rectifier 60, the capacitor 62 charges and the opto coupler 64 triggers the SCR 56. When the SCR 56 is switched on it supplies power to the IC 26.1 and the audible test signal is then supplied to the telephone line. When the line is disconnected, the test circuitry is deenergised and reset.

I claim:

1. A telephone line testing device for use with a PABX having a plurality of input lines connected to a plurality of telephone lines of a telephone system, each of said input lines of the PABX being associated with one of said telephone lines, said telephone line testing device including:
   (a) test circuitry having
      (i) a signal generator for generating a test signal;
      (ii) a ringing signal detector for detecting the presence of a ringing signal on said telephone lines; and
      (iii) a second switch means which is responsive to the ringing signal detector for automatically supplying a test signal generated by the signal generator when a ringing signal is detected on one of said telephone lines;
   (b) a first connecting means for connection to said telephone lines of the telephone system;
   (c) a second connecting means for connection to said input lines of the PABX; and
   (d) a first switch means for connecting a selected one of said telephone lines either to said input line of the PABX associated with said selected one of said telephone lines or the test circuitry.

2. The telephone line testing device, as claimed in claim 1, wherein the first connecting means includes a plurality of first terminals to which a corresponding number of said telephone lines may be connected.

3. The telephone line testing device, as claimed in claim 2, wherein the second connecting means includes a plurality of second terminals to which a corresponding number of said input lines of the PABX may be connected, there being the same number of said second terminals as there are said first terminals, and with designated ones of said first and said second terminals being associated with one another.

4. The telephone line testing device, as claimed in claim 3, wherein the first switch means includes a plurality of mechanically operable switches, each of said mechanically operable switches having a first contact connected to an associated one of said first terminals, a second contact connected to said second terminal associated with said first terminal, a third contact connected to the test circuitry, and a contactor for connecting the first contact to either the second contact or the third contact.

5. The telephone line testing device, as claimed in claim 4, wherein the ringing signal detector is connected to all the third contacts of the first switch means.

6. The telephone line testing device, as claimed in claim 5, wherein the signal generator is connected to all the third contacts of the first switch means via the second switch means.

* * * * *